United States Patent
Song et al.

(10) Patent No.: US 10,301,414 B2
(45) Date of Patent: May 28, 2019

(54) SILICON CONTAINING POLYMER FLOCCULANTS

(71) Applicant: Cytec Industries Inc., Woodland Park, NJ (US)

(72) Inventors: Airong Song, Larchmont, NY (US); Dannon Stigers, Milford, CT (US); Xinyu Wei, Newington, CT (US); Lei Zhang, Stamford, CT (US)

(73) Assignee: Cytec Industries Inc., Woodland Park, NJ (US)

( * ) Notice: Subject to any disclaimer, the term of this patent is extended or adjusted under 35 U.S.C. 154(b) by 443 days.

(21) Appl. No.: 14/960,740

(22) Filed: Dec. 7, 2015

(65) Prior Publication Data

US 2016/0159660 A1   Jun. 9, 2016

Related U.S. Application Data

(60) Provisional application No. 62/089,024, filed on Dec. 8, 2014.

(51) Int. Cl.
| | | |
|---|---|---|
| *C08F 230/08* | (2006.01) | |
| *C08F 30/08* | (2006.01) | |
| *C02F 1/56* | (2006.01) | |
| *C01F 7/06* | (2006.01) | |
| *C08F 220/06* | (2006.01) | |
| *C08F 8/42* | (2006.01) | |
| *C08F 220/10* | (2006.01) | |
| *C08L 33/08* | (2006.01) | |

(52) U.S. Cl.
CPC .......... *C08F 230/08* (2013.01); *C01F 7/0653* (2013.01); *C02F 1/56* (2013.01); *C08F 30/08* (2013.01); *C08F 8/42* (2013.01); *C08F 220/06* (2013.01); *C08F 220/10* (2013.01); *C08L 33/08* (2013.01)

(58) Field of Classification Search
None
See application file for complete search history.

(56) References Cited

U.S. PATENT DOCUMENTS

| | | | |
|---|---|---|---|
| 4,767,540 A | 8/1988 | Spitzer et al. | |
| 4,886,872 A | 12/1989 | Fong et al. | |
| 5,080,801 A * | 1/1992 | Molter .............. | C02F 5/12 209/5 |
| 5,516,435 A | 5/1996 | Lewellyn | |
| 5,539,046 A | 7/1996 | Lewellyn | |
| 6,608,137 B1 | 8/2003 | Heitner et al. | |
| 6,814,873 B2 | 11/2004 | Sptizer et al. | |
| 7,442,755 B2 | 10/2008 | Sptizer et al. | |
| 7,674,385 B2 * | 3/2010 | Heitner ............. | C02F 5/10 162/DIG. 4 |
| 7,988,863 B2 | 8/2011 | Heitner | |
| 7,999,065 B2 | 8/2011 | Heitner et al. | |
| 8,119,743 B2 | 2/2012 | Heitner | |
| 2008/0257827 A1 * | 10/2008 | Dai ..................... | B03D 3/06 210/729 |
| 2010/0098607 A1 | 4/2010 | Davis et al. | |
| 2012/0125862 A1 | 5/2012 | Dai et al. | |
| 2013/0048571 A1 | 2/2013 | Chen et al. | |

* cited by examiner

*Primary Examiner* — Clare M Perrin

(57) ABSTRACT

Disclosed herein are silicon containing polymers and compositions containing the same able to flocculate suspended solids in the Bayer or Sinter process stream.

15 Claims, No Drawings

SILICON CONTAINING POLYMER FLOCCULANTS

This patent application claims priority to pending U.S. Ser. 62/089,024 filed Dec. 8, 2014, incorporated herein in its entirety.

BACKGROUND OF THE INVENTION

Field of the Invention.

This invention relates to polymers, compositions and methods for removing suspended solids in continuous production processes. More particularly, this invention discloses silicon-containing polymers flocculants for removing suspended solids in alumina production process streams.

Description of the Related Art.

Bauxite is the basic raw material for almost all manufactured aluminum compounds. In the course of production of aluminum compounds, bauxite can be refined to aluminum hydroxide and subsequently to alumina by the Bayer process, the Sinter process, and combinations thereof. Bauxites are typically classified according to their main mineralogical constituents as gibbsitic, boehmitic and diasporic. The mineralogical composition of bauxite can impact the method of processing.

During the Bayer process, raw bauxite ore is first heated with caustic solution at high temperatures to produce dissolution (digestion) of most of the aluminum-bearing minerals and give a supersaturated solution of sodium aluminate. Examples of the aluminum-bearing minerals include but are not limited to diaspore, the alumina trihydrate gibbsite, and alumina monohydrate boehmite. The resulting concentrations of dissolved materials are very high, with sodium hydroxide concentrations typically being greater than 150 g/L and dissolved alumina typically being greater than 120 g/L. Any undissolved solids known as the "red mud" solids, are then physically separated from the aluminate solution. A polymeric flocculant is often used to speed the removal of the fine solid particles. The red mud solids are principally composed of iron oxide but can contain other insoluble minerals such as complex aluminosilicates, sodium and calcium titanates, and hydroxyapatite. The residual suspended solids are removed by a filtration step. The filtered clear solution or liquor is cooled and seeded with alumina trihydrate to precipitate a portion of the dissolved alumina. After alumina precipitation, the solution (also called spent liquor) is reheated and reused to dissolve more fresh bauxite.

The Sinter process is an alternative or adjuvant to the Bayer process, and is commonly used for the treatment of high silica-containing bauxites. In the Sinter process, bauxite (or "red mud") is calcined at 1200° C. with soda and/or lime prior to leaching with NaOH solution, generating sodium aluminate liquor (also commonly referred to as "supersaturated green liquor") and insoluble "sinter mud".

In many parts of the world bauxite is primarily composed of iron oxide and aluminum oxide, with only a minor amount of silicate minerals. Such bauxites therefore have a fairly low level of silicon as measured by $SiO_2$ content. Typically, these bauxites have a $SiO_2$ content of less than 5% $SiO_2$. Still, in some parts of the world, the level of silicon-containing minerals in the bauxite can be higher. In such bauxite the $SiO_2$ content can be, e.g., 5% or higher, and even as high as 10-20% $SiO_2$. This higher $SiO_2$ content is due to the presence of silicon containing minerals in the bauxite, such as kaolinite, illite, pyrophilite, chamosite or silica in its various forms (e.g., quartz). The caustic solution used to dissolve the aluminum minerals in the bauxite also dissolves part or all of the silica content therein, especially silica present in the form of aluminosilicate clays.

In the digestion step of the alumina recovery process, silica rapidly dissolves to form solutions supersaturated with silica. This dissolved silicate reacts with sodium aluminate or calcium aluminate in solution to form complex hydrated sodium or calcium aluminum silicates, part of which precipitates out of solution. Silicate mineral precipitants present in alumina recovery process liquors include cancrinite, sodalite, katoite, garnet, andradite, and various forms of calcium aluminosilicates.

Separation of undissolved suspended "mud" solids such as complex aluminosilicates from the alumina stream is an important part of the process and ensures that the precipitation step in the alumina recovery process can be carried out efficiently, resulting in a high quality alumina trihydrate product. Removal of suspended mud solids from a continuous process stream of red mud can be accomplished with the use of flocculants, which act to agglomerate the suspended solids causing them to settle more quickly. Historically, this flocculation step has been performed using polymeric materials such as starch and polyacrylate polymers. More recently, hydroxamated polymers have been used as Bayer process flocculants, such as those described in U.S. Pat. No. 4,767,540.

U.S. Patent Application Publication No. 2008/0257827 further discloses the addition of silicon-containing flocculants to Bayer process streams, particularly in combination with polyacrylate, hydroxamated polyacrylamides or poly (acrylamide-co-acrylate), for reducing solid content such as red mud present in Bayer process streams. Silicon-containing polymers disclosed in the '827 publication were prepared by various methods, including preparing a precursor polymer containing vinylformamide units, hydrolyzing them to form vinyl amine units, and then reacting with a silane agent to attach a silicon-containing pendant group to the amine group.

Still, there remains a need for an efficient way to remove much more of the unflocculated solids that remain suspended after use of current flocculation techniques since removal of such unflocculated suspended solids, which are currently considered very difficult to flocculate, involve the use of other solids/liquids handling step(s) such as filtration. In particular, there is needed flocculants able to remove these remaining unflocculated solids so that the filtration step is eliminated or at least less down time in cleaning the filter is required.

SUMMARY OF THE INVENTION

Provided herein are silicon-containing polymer flocculants comprising an A mer according to formula (I):

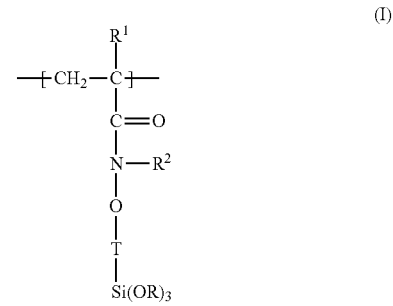

In the above A mer, R can be independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4{}^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups. $R^1$ and $R^2$ can each independently be H or $C_{1-6}$ alkyl. T can be a direct bond or an organic connecting group containing from about 1 to about 20 carbons.

Polymer flocculants containing the above A mer are formed by reacting a polyacrylamide, preferably at least partially hydroxamated, with a silane-containing compound.

In addition to the required A mer, the above polymer flocculant can include one or more of several other mers.

Another aspect of the disclosure relates to a silicon-containing polymeric reaction product of at least a hydroxamate reactive compound having an $-Si(OR)_3$ group and a hydroxamate-reactive group, and a hydroxamate polymer.

Another aspect of the present disclosure relates to a composition including a silicon-containing polymer having at least one silicon-containing pendant group $-Si(OR)_3$ wherein the silicon-containing polymer has a Standard Viscosity of about 9 mPa·s or greater.

In addition to the above silicon-containing polymer flocculant and silicon-containing polymeric reaction product, the present disclosure provides for compositions comprising these flocculants or reaction product and a second different flocculant.

One additional aspect of the present disclosure relates to a flocculation method for an alumina recovery process comprising intermixing the silicon-containing polymer containing the A mer or a composition as described herein with a process stream in an amount effective to flocculate at least a portion of a solid suspended in the process stream, thereby forming an at least partially clarified process stream, wherein the suspended solid is selected from the group consisting of red mud, sinter mud, desilication product, and mixtures thereof.

These and other embodiments are described in greater detail below.

DETAILED DESCRIPTION OF THE PREFERRED EMBODIMENTS

Definitions

As used herein, "$C_a$ to $C_b$" or "$C_{a-b}$", wherein "a" and "b" are integers, refer to the number of carbon atoms in the specified group. That is, the group can contain from "a" to "b", inclusive, carbon atoms. Thus, for example, a "$C_1$ to $C_4$ alkyl" or "$C_{1-4}$ alkyl" group refers to all alkyl groups having from 1 to 4 carbons, that is, $CH_3-$, $CH_3CH_2-$, $CH_3CH_2CH_2-$, $(CH_3)_2CH-$, $CH_3CH_2CH_2CH_2-$, $CH_3CH_2CH(CH_3)-$ and $(CH_3)_3C-$.

The term "halogen" or "halo," as used herein, means any one of the radio-stable atoms of column 7 of the Periodic Table of the Elements, e.g., fluorine, chlorine, bromine, or iodine.

As used herein, "alkyl" refers to a straight or branched hydrocarbon chain that is fully saturated (i.e., contains no double or triple bonds). The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 9 carbon atoms. The alkyl group could also be a lower alkyl having 1 to 4 carbon atoms. The alkyl group of the compounds may be designated as "$C_{1-4}$ alkyl" or similar designations. By way of example only, "$C_{1-4}$ alkyl" indicates that there are one to four carbon atoms in the alkyl chain, i.e., $CH_3-$, $CH_3CH_2-$, $CH_3CH_2CH_2-$, $(CH_3)_2CH-$, $CH_3CH_2CH_2CH_2-$, $CH_3CH_2CH(CH_3)-$ and $(CH_3)_3C-$. Typical alkyl groups include, but are in no way limited to, methyl, ethyl, propyl, isopropyl, butyl, isobutyl, tertiary butyl, pentyl, hexyl, and the like.

As used herein, "alkoxy" refers to the formula $-OR''$ wherein R'' is an alkyl or alkenyl group containing from 1 to 20 carbon atoms, such as "$C_{1-9}$ alkoxy", including but not limited to methoxy, ethoxy, n-propoxy, 1-methylethoxy (isopropoxy), n-butoxy, iso-butoxy, sec-butoxy, and tert-butoxy, and the like.

It is to be understood that certain radical naming conventions can include either a mono-radical or a di-radical, depending on the context. For example, where a substituent requires two points of attachment to the rest of the molecule, it is understood that the substituent is a di-radical. For example, a substituent identified as alkyl that requires two points of attachment includes di-radicals such as $-CH_2-$, $-CH_2CH_2-$, $-CH_2CH(CH_3)CH_2-$, and the like. Other radical naming conventions clearly indicate that the radical is a di-radical such as "alkylene" or "alkenylene".

As used herein, "alkylene" means a branched, or straight chain fully saturated di-radical chemical group containing only carbon and hydrogen that is attached to the rest of the molecule via two points of attachment (i.e., an alkanediyl). The alkylene group may have 1 to 20 carbon atoms, although the present definition also covers the occurrence of the term alkylene where no numerical range is designated. The alkylene group may also be a medium size alkylene having 1 to 9 carbon atoms. The alkylene group could also be a lower alkylene having 1 to 4 carbon atoms. The alkylene group may be designated as "$C_{1-4}$ alkylene" or similar designations. By way of example only, "$C_{1-4}$ alkylene" indicates that there are one to four carbon atoms in the alkylene chain, that is, the alkylene chain is selected from the group consisting of methylene, ethylene, ethan-1,1-diyl, propylene, propan-1,1-diyl, propan-2,2-diyl, 1-methyl-ethylene, butylene, butan-1,1-diyl, butan-2,2-diyl, 2-methyl-propan-1,1-diyl, 1-methyl-propylene, 2-methyl-propylene, 1,1-dimethyl-ethylene, 1,2-dimethyl-ethylene, and 1-ethyl-ethylene.

As used herein, reference to a polymer or composition that is "substantially free" of a particular pendant groups, component, ingredient, or agent means that the polymer or composition contains an amount of that pendant groups, component, ingredient or agent that is not detectable by an analytic technique known by those skilled in the art to be useful for detecting the particular component, ingredient or agent. For example, Nuclear Magnetic Resonance (NMR) spectroscopy can be used to detect and determine the amount of a particular comonomer component in a copolymer. By way of example only, in many cases the pendant groups, compositions or polymers described herein may be considered to be substantially free of such components, ingredients or agents when they contain less than 2%, less than 1%, less than 0.5%, or 0% of such agents by weight of the composition or by mole based on total mers in the polymer.

As used herein, "hydroxamate reactive compound" refers to any compounds having one or more functional groups that can react with a hydroxamate group. Examples of hydroxamate reactive compounds include but are not limited to halogen functional silanes, epoxy functional silanes, and/or isocyanate functional silanes. Such hydroxamate reactive compounds are commercially available, e.g., from Gelest, Inc., Morrisville, Pa. (USA), or may be synthesized by techniques known to those skilled in the art.

As used herein, "hydroxamate polymer" refers to a polymer that contains one or more pendant hydroxamate groups. Examples of hydroxamate polymers include those containing a I-1 mer of formula (IX-A) or a I-2 mer of formula (IX-B) as described elsewhere herein. Hydroxamate polymers may be copolymers and thus may contain other pendant groups. For example, poly(acrylamide-co-acrylate-co-hydroxamate) is a hydroxamate polymer that contains pendant hydroxamate groups as well as acrylamide and acrylate units.

As used herein, "hydroxamate group" refers to a —C(O)—N(OH)— group and/or its salt form —C(O)—N(O⁻)—.

As used herein "halogen functional silane" means a silane compound containing one or more halogen substituents. By way of example only, halogen functional silane includes but is not limited to ((chloromethyl)phenylethyl)-trimethoxysilane (including m isomers, p isomers and combinations thereof), (p-chloromethyl)phenyltrimethoxy-silane, chloromethyltriethoxysilane, 3-chloropropyltriethoxysilane, 3-chloropropyltrimethoxysilane, 7-bromoheptyltimethoxysilane, 3-bromopropyltrimethoxysilane, 11-bromoundecyltrimethoxysilane, 3-iodopropyltrimethoxysilane, 3-(trimethoxysilypropyl)-2-bromo-2-methylpropionate, chloromethymethyldiethoxysilane, ((chloromethyl)phenylethyl)-methyldimethoxysilane (including both m, p isomers and combinations thereof), 3-chloropropylmethyldimethoxy-silane, 3-chloroisobutyldimethylmethoxy-silane, chloromethyldimethylethoxysilane, 3-chloropropyldimethylethoxysilane, 3-chloropropyldimethylmethoxy-silane, 2-chloroethyldichlorosilane, chloromethyldimethylchlorosilane, chloromethyltrichlorosilane, 1-trimethoxysilyl-2(p,m-chloromethyl)phenylethane, (4-iodo-1-butynyl)(trimethyl)silane and (5-iodo-1-pentynyl)(trimethyl)silane.

As used herein "epoxy functional silane" means a silane compound containing one or more epoxy substituents. By way of example only, the epoxy functional silane includes but is not limited to 2-(3,4-epoxycyclohexyl)ethyl-triethoxysilane, 2-(3,4-epoxycyclohexyl)ethyl-trimethoxysilane, (3-glycidoxypropyl)trimethoxysilane, (3-glycidoxypropyl)triethoxysilane, 5,6-epoxyhexyltriethoxysilane, (3-glycidoxypropyl)methyldiethoxy-silane, and (3-glycidoxypropyl)dimethylethoxy-silane.

As used herein "isocyanate functional silane" means a silane compound containing one or more isocyanate substituents. By way of example only, the isocyanate functional silane includes but is not limited to 3-isocyanatopropyltriethoxysilane, (isocyanatomethyl)methyldimethoxy-silane, 3-isocyanatopropyltrimethoxy-silane, tris(3-trimethoxysilylpropyl)isocyanurate, (3-triethoxysilyipropyl)-t-butylcarbarnate, triethoxysilylpropylethylcarbamate, and 3-thiocyanatopropyitriethoxysilane.

The term "Standard Viscosity" (SV), as used herein, is a viscosity measurement for a polymer that is determined on a 0.1% polymer solution (calculated based on the acid form of the backbone polymer before it is functionalized with hydroxamate and silane groups), at 25° C. in 1 M NaCl and 2 wt % NaOH. The SV measurement is performed using a Brookfield LVT viscometer with LV-1 spindle and with an Ultra Low (UL) Adaptor. For SV that is less than 10 mPa·s, the SV is measured directly at a spindle speed of 60 rpm. For SV that is greater than 10 mPa·s, the SV is measured at 30 rpm and the final SV is calculated by multiplying the viscosity measured at 30 rpm by a conversion factor of 0.85. For a polymer that has been derivatized as described herein, the 0.1% concentration for the polymer during the measurement is based on the acid form of the precursor backbone polymer and thus, for example, the SV determination for the polymer solids of a silanated hydroxamated poly(acrylamide-co-acrylic acid) copolymer is based on the polymer solids of the poly(acrylamide-co-acrylic acid) copolymer before the hydroxamation and silanation reactions have been undertaken. A reference to the SV of a polymer or composition herein means a Standard Viscosity measured five or more days after the manufacture of the polymer or composition. The SV of the polymer or composition described herein may change during a short period of time after manufacture and then stabilizes over time. For example, the SV of polymer B described in Example 2 below increased during a short time after manufacture and stabilized within 80 days after manufacture.

Silicon-containing Polymers

Provided herein is a silicon-containing polymer flocculant having an A mer according to the following formula (I)—

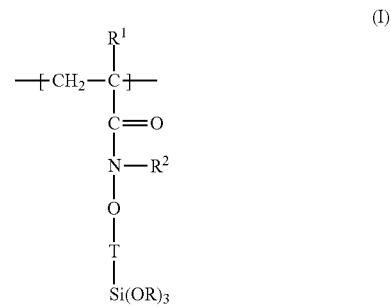

wherein each R is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4{}^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups. $R^1$ and $R^2$ are each independently H or $C_{1-6}$ alkyl. T is a direct bond or an organic connecting group comprising from about 1 to about 20 carbons.

Preferably, $R^1$ and $R^2$ are independently H, —$CH_3$, or —$CH_2$—$CH_3$.

Examples of organic connecting groups for T include optionally substituted $C_{1-20}$ alkylene or $C_{1-20}$ alkyloxyalkylene groups or optionally substituted $C_{1-20}$ oxyalkylene; —$(CH_2)_3$—, —$(CH_2)_4$—, or —$(CH_2)_5$—; —$(CH_2)_a$—CH (OH)—(CH$_2$)$_b$—, wherein each of a and b is independently an integer in the range of 0 to 10; —(CH$_2$)$_a$—CH(OH)—CH$_2$—O—(CH$_2$)$_b$—, wherein each of a and b is independently an integer in the range of 0 to 10; and —CH$_2$—CH(OH)—CH$_2$—O—CH$_2$—CH$_2$—CH$_2$—.

The amount of A mer according to formula (I) in silicon-containing polymer flocculants described herein can vary depending on the amount of other mers in the polymer. With one or more other mers present in the polymer, the amount of A mer according to formula (I) is from about 0.1% to about 99.9% by mole, based on total mers in the polymer. In one embodiment, the amount of A mer according to formula (I) is at least about 1% by mole, based on total mers in the polymer flocculant; preferably, about 17% by mole, based on total mers in the polymer flocculant. In another embodiment, the amount of A mer according to formula (I) is in the range of about 5% to about 40%, preferably in the range of about 10% to about 25% by mole, based on total mers in the polymer flocculant.

B Mers—

The above polymer may additionally contain 7.5% or less by mole, based on total mers in the polymer flocculant, of a B mer according to formula (II):

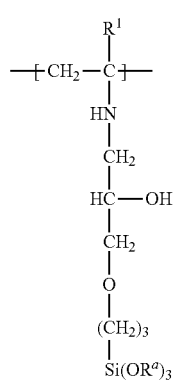

(II)

wherein R$^1$ is as defined above and R$^a$ is independently selected from the group consisting of hydrogen, C$_{1-20}$ alkyl, C$_{1-20}$ alkenyl, C$_{6-12}$ aryl, C$_{7-20}$ aralkyl, a group I metal ion, a group II metal ion, and NR'$_4^+$; wherein R' is independently selected from the group consisting of hydrogen, C$_{1-20}$ alkyl, C$_{1-20}$ alkenyl, C$_{6-12}$ aryl, and C$_{7-20}$ aralkyl; and wherein R' is independently unsubstituted, hydroxy-substituted, or beta hydroxy substituted or a mixture, in any proportion, of any of these groups; In some embodiments, R$^a$ is independently H, —CH$_3$, —CH$_2$—CH$_3$, Na$^+$, K$^+$, and/or NH$_4^+$. R$^a$ can be any of these groups in any proportion.

The amount of B mer according to formula (II) present in the silicon-containing polymer flocculant can vary depending on the amount of other mers in the polymer. Preferably, the amount of B mer according to formula (II) is about 7.5% or less, more preferably about 2% or less, more preferably about 1% or less, more preferably about 0.1% or less, and even more preferably about 0.2% or less by mole, based on total mers in the polymer. Further, the silicon-containing polymer described herein can be substantially free of or not include any B mer according to Formula (II).

In some embodiments, the silicon-containing polymer flocculant described herein can include 7.5% or less by mole, based on total mers in the polymer, of a B-1 mer according to formula (II-A) and/or a B-2 mer according to formula (II-B):

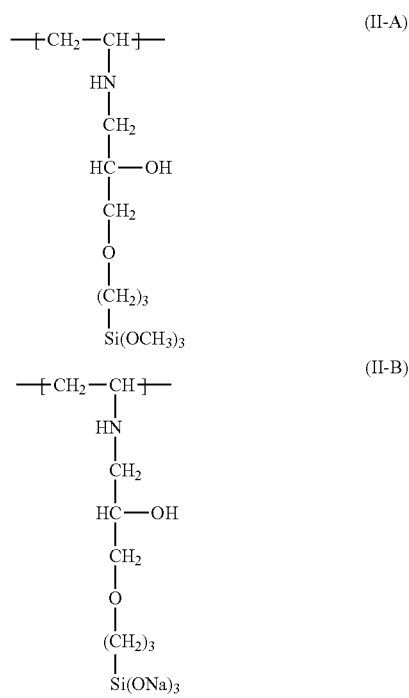

wherein R$^1$ is H and R$^a$ is CH$_3$ for B-1 and sodium for B-2.

The amount of B-1 mer according to formula (II-A) in the silicon-containing polymer flocculant can vary depending on the amount of other mers in the polymer. Preferably, the amount of B-1 mer according to formula (II-A) present in the silicon-containing polymer is about 7.5% or less; more preferably, about 2% or less; more preferably, about 1% or less; more preferably, about 0.1% or less; and even more preferably, about 0.2% or less by mole, based on total amount of other mers in the silicon-containing polymer flocculant. Further, the silicon-containing polymer flocculant described herein can be substantially free of or not include any B-1 mer according to Formula (II-A).

The amount of B-2 mer according to formula (II-B) in the silicon-containing polymer flocculant can vary depending on the amount of other mers in the polymer. Preferably, the amount of B-2 mer according to formula (II-B) present in the silicon-containing polymer is about 7.5% or less; more preferably, about 2% or less; more preferably, about 1% or less; more preferably, about 0.1% or less; and even more preferably, about 0.2% or less by mole, based on total amount of other mers in the silicon-containing polymer flocculant. Further, the silicon-containing polymer flocculant described herein can be substantially free of or not include any B-2 mer according to formula (II-B).

C Mers

The silicon-containing polymer flocculant described herein may additionally contain 4% or less by mole, based on total mers in the polymer flocculant, of a C mer according to formula (III)—

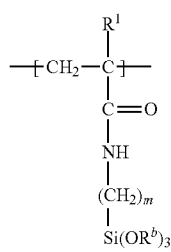

(III)

wherein $R^1$ is as described above; $R^b$ is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4{}^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups; and m is an integer from 1 to 6. Preferably, $R^b$ is independently —$CH_3$, —$CH_2$—$CH_3$, $Na^+$, $K^+$, and/or $NH_4{}^+$. $R^b$ can be any of these groups in any proportion.

The amount of C mer according to formula (III) present in the silicon-containing polymer flocculant can vary depending on the amount of other mers in the polymer. Preferably, the amount of C mer according to formula (III) present in the silicon-containing polymer flocculant is about 4% or less; more preferably, about 2% or less; more preferably, about 1% or less; more preferably, about 0.5% or less; more preferably about 0.2% or less; and even more preferably, about 0.1% or less by mole, based on total mers in the polymer. Further, the silicon-containing polymer flocculant described herein can be substantially free of or not include any C mer according to formula (III).

In some embodiments, the silicon-containing polymer described herein contains 4% or less by mole, based on total mers in the polymer flocculant, of a C-1 mer according to formula (III-A) or a C-2 mer according to formula (III-B)—

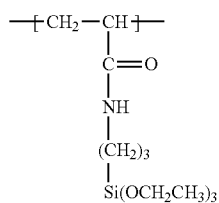

(III-A)

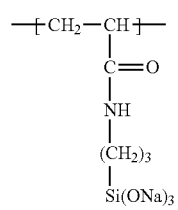

(III-B)

wherein $R^1$ is hydrogen and m is 3 for both the C-1 mer and the C-2 mer; and $R^b$ is —$CH_2CH_3$ for the C-1 mer according to formula (III-A), and sodium for the C-2 mer according to formula (III-B).

The amount of C-1 mer according to formula (III-A) in the silicon-containing polymer flocculant can vary depending on the amount of other mers in the polymer. Preferably, the amount of C-1 mer according to formula (III-A) present in the silicon-containing polymer is about 4% or less; more preferably, about 2% or less; more preferably, about 1% or less; more preferably, about 0.5% or less; more preferably, about 0.2% or less; and even more preferably, about 0.1% or less by mole, based on total mers in the polymer flocculant. Further, the silicon-containing polymer flocculant described herein can be substantially free of or not include any C-1 mer according to formula (III-A).

The amount of C-2 mer according to formula (III-A) in the silicon-containing polymer flocculant can vary depending on the amount of other mers in the polymer. Preferably, the amount of C-1 mer according to formula (III-A) present in the silicon-containing polymer flocculant is about 4% or less; more preferably, about 2% or less; more preferably, about 1% or less; more preferably, about 0.5% or less; more preferably, about 0.2% or less; and even more preferably, about 0.1% or less by mole, based on total mers in the polymer. Further, the silicon-containing polymer flocculant described herein can be substantially free of or not include any C-2 mer according to formula (III-B).

D Mers

The silicon-containing polymer flocculant described herein can further contain about 7.5% or less by mole, based on total mers in the polymer, of a D mer according to formula (IV)—

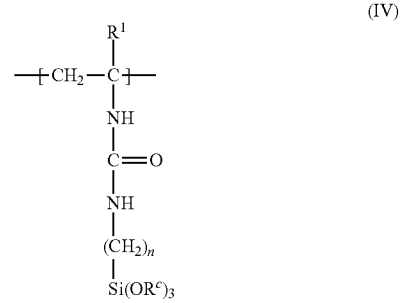

(IV)

wherein $R^1$ is as described above; $R^c$ is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4{}^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups; and n is an integer from 1 to 6. Examples of optionally substituted $C_{1-6}$ alkyls for $R^c$ include —$CH_3$ and/or —$CH_2$—$CH_3$. In some embodiments, $R^c$ is $Na^+$, $K^+$, and/or $NH_4{}^+$. $R^c$ can be any of these groups in any proportion.

The amount of D mer according to formula (IV) in the silicon-containing polymer flocculant can vary depending on the amount of other mers in the polymer. Preferably, the amount of D mer according to formula (IV) present in the silicon-containing polymer is about 7.5% by mole; more preferably, about 7.5% by mole; more preferably, about 2.0% by mole; more preferably, about 1.0% by mole; more preferably, about 0.5% by mole; more preferably, about 0.2% by mole; and even more preferably, about 0.1% by mole, based on total mers in the polymer. Further, the silicon-containing polymer flocculant described herein can be substantially free of or not include any D mer according to formula (IV).

In some embodiments, the silicon-containing polymer described herein contains 7.5% or less by mole, based on total mers in the polymer, of a D-1 mer according to formula (IV-A) or a D-2 mer according to formula (IV-B)—

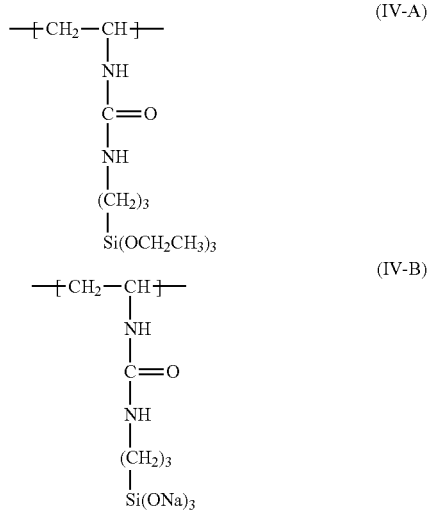

wherein $R^1$ is hydrogen and m=3 for both D-1 mer and D-2 mer, and $R^c$ is —CH$_2$CH$_3$ for the D-1 mer and sodium for the D-2 mer.

The amount of D-1 mer according to formula (IV-A) present in the silicon-containing polymer flocculant can vary depending on the amount of other mers in the polymer. Preferably, the amount of D-1 mer according to formula (IV-A) present in the silicon-containing polymer is about 7.5% by mole; more preferably, about 7.5% by mole; more preferably, about 2.0% by mole; more preferably, about 1.0% by mole; more preferably, about 0.5% by mole; more preferably, about 0.2% by mole; and even more preferably, about 0.1% by mole, based on total mers in the polymer. Further, the silicon-containing polymer flocculant described herein can be substantially free of or not include any D-1 mer according to formula (IV-A).

The amount of D-2 mer according to formula (IV-B) present in the silicon-containing polymer flocculant can vary depending on the amount of other mers in the polymer. Preferably, the amount of D-2 mer according to formula (IV-B) present in the silicon-containing polymer is about 7.5% by mole; more preferably, about 7.5% by mole; more preferably, about 2.0% by mole; more preferably, about 1.0% by mole; more preferably, about 0.5% by mole; more preferably, about 0.2% by mole; and even more preferably, about 0.1% by mole, based on total mers in the polymer. Further, the silicon-containing polymer flocculant described herein can be substantially free of or not include any D-2 mer according to formula (IV-B).

E Mers

The silicon-containing polymer flocculant as disclosed herein can further contain an E mer according to formula (V)—

wherein $R^6$ is hydrogen, a group I metal ion, a group II metal ion, or $N(R^3)_4^+$, and $R^1$ and $R^3$ are as defined above. Preferably, $R^6$ is hydrogen, Na$^+$, K$^+$ or NH$_4^+$.

The amount of E mer according to formula (V) present in the silicon-containing polymer flocculant can vary depending on the amount of other mers in the polymer. In one embodiment, the amount of E mer according to formula (V) present in the silicon-containing polymer is from about 1% to about 90%; more preferably about 10% to about 90%; and even more preferably about 20% to about 80% by mole, based on total mers in the polymer. In another embodiment, the amount of E mer according to formula (V) present in the silicon-containing polymer is in an amount from about 1% to 80% by mole, based on total mers in the polymer. In another embodiment, the amount of E mer according to formula (V) present in the silicon-containing polymer flocculant is in an amount of about 67% by mole, based on total mers in the polymer.

F Mers

The silicon-containing polymer flocculant according to the present invention can further contain an F mer according to formula (VI)—

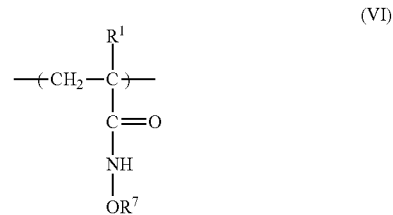

wherein $R^7$ is hydrogen, a group I metal ion, a group II metal ion, or $N(R^3)_4^+$, and $R^1$ and $R^3$ are as defined above. Preferably, $R^7$ is hydrogen, Na$^+$, K$^+$ or NH$_4^+$.

The amount of F mer according to formula (VI) present in the silicon-containing polymer flocculant can vary depending on the amount of other mers in the polymer. In one embodiment, the amount of F mer according to formula (VI) present in the silicon-containing polymer is from about 1.0% to about 90% by mole, based on total mers in the polymer. In another embodiment, the amount of F mer according to formula (VI) present in the silicon-containing polymer is from about 1.0% to about 40% by mole, based on total mers in the polymer. In another embodiment, the F mer according to formula (VI) is present in an amount from about 1% to about 20% by mole, based on total mers in the polymer. In another embodiment, the F mer according to formula (VI) is present in an amount of about 17% or less by mole, based on total mers in the polymer flocculant.

The combined amount of A mer according to formula (I) and F mer according to formula (VI) present in the silicon-containing polymer flocculant can vary depending on the amount of other mers in the polymer. In one embodiment, the combined amount of A mer according to formula (I) and F mer according to formula (VI) present in the silicon-containing polymer flocculant is from about 0.1% to about 99.9%; more preferably, about 1% to about 90%; more preferably, about 5% to about 80%; more preferably, about 5% to about 60%; more preferably, about 5% to about 40%; and even more preferably, about 10% to about 25% by mole, based on total mers in the polymer flocculant.

G Mers

In some embodiments, the silicon-containing polymer flocculant described herein can further include a G mer according to Formula (VII)—

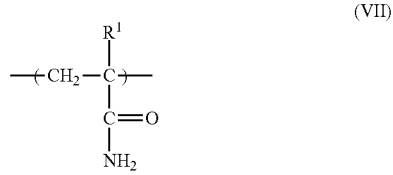

(VII)

wherein $R^1$ is as defined above.

The amount of G mer according to formula (VII) present in the silicon-containing polymer flocculant can vary depending on the amount of other mers in the polymer. In some embodiments, the amount of G mer according to formula (VII) present in the silicon-containing polymer is from about 0.1% to about 90% by mole, based on total mers in the polymer. In some embodiments, the amount of G mer according to formula (VII) present in the silicon-containing polymer is about 16% by mole, based on total mers in the polymer flocculant.

The average molecular weights of the silicon-containing polymer flocculants described herein are related to the SV of the polymers, but no direct correlation has been determined between the average molecular weight and the SV of the polymers. A polymer having a greater SV can be expected to have a higher molecular weight than a polymer with a lower SV. For example, Polymer C described in Example 3 below has a greater SV than Polymer B described in Example 2; therefore, Polymer C can be expected to have a higher average molecular weight than Polymer B.

The Standard Viscosity (SV) of the silicon-containing polymer flocculant can vary depending on the type of polymer and length of the polymer chains. In some embodiments, the polymer has a SV of about 6 mPa·s or greater. In some embodiments, the polymer has a SV of about 25 mPa·s or less.

Silicon-containing Polymeric Reaction Product

Another aspect of the present disclosure relates to a silicon-containing polymeric reaction product of (a) a hydroxamate polymer and (b) a hydroxamate reactive compound having an —Si(OR)$_3$ group and a hydroxamate-reactive group wherein R is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4{}^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups. The hydroxamate polymer can include 7.5% or less by mole, based on total mers in the polymer, of an H mer according to formula (VIII)—

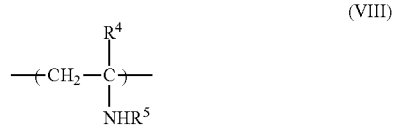

(VIII)

wherein $R^4$ and $R^5$ are each independently H or optionally substituted $C_{1-6}$ alkyl. Preferably, $R^4$ and $R^5$ are each independently H, —CH$_3$, or —CH$_2$—CH$_3$.

The amount of H mer according to formula (VIII) present in the hydroxamate polymer can vary depending on the method for preparing the hydroxamate polymer and the amount and type of other mers in the hydroxamate polymer. As noted above, the hydroxamate polymer comprises about 7.5% or less by mole, based on total mers in the polymer, of the H mer according to formula (VIII). In some embodiments, the hydroxamate polymer comprises about 1% or less by mole; preferably about 0.2% or less by mole; preferably about 0.1% or less by mole; and even more preferably about 0.05% or less by mole, based on total mers in the polymer, of the H mer according to formula (VIII). Further, the hydroxamate polymer can be substantially free of the H mer according to formula (VIII).

In other embodiments the hydroxamate polymer includes an I-1 mer according to formula (IX-A) and/or an I-2 mer according to formula (IX-B)—

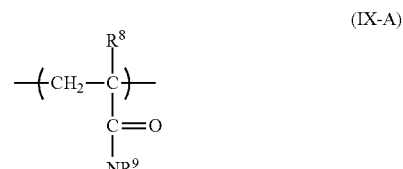

(IX-A)

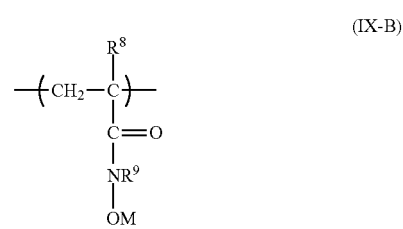

(IX-B)

wherein $R^8$ and $R^9$ are each independently H or $C_{1-6}$ alkyl and M is a group I metal ion, group II metal ion, or $N(R^3)_4{}^+$ where $R^3$ is independently H or $C_{1-6}$ alkyl. Preferably, $R^8$ and $R^9$ are independently H, —CH$_3$, or —CH$_2$—CH$_3$. Preferably, M is Na$^+$, K$^+$, or NH$_4{}^+$.

The hydroxamate polymer can be a copolymer and thus can contain two or more different types of mers. In some embodiments, the hydroxamate polymer comprises a I mer of formula (IX). In some embodiments, the hydroxamate polymer is poly(acrylamide-co-acrylate-co-hydroxamate).

The hydroxamate reactive compound can be any compound that has one or more functional groups suitable to react with the hydroxamate group on the polymer. In some embodiments, the hydroxamate reactive compound is halogen functional silane, epoxy functional silane, or isocyanate functional silane. In some embodiments, the hydroxamate reactive compound is glycidoxypropyl trimethoxysilane or glycidoxypropyl triethoxysilane.

In some embodiments, the above described silicon-containing polymeric reaction product includes an A mer according to formula (I)—

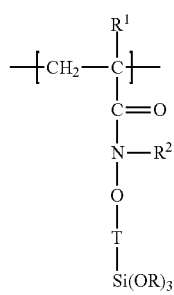

(I)

wherein:
each R is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4{}^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups;
$R^1$ and $R^2$ are each independently H or $C_{1-6}$ alkyl; and
T is a direct bond or an organic connecting group comprising from about 1 to about 20 carbons; and
the amount of the A mer of formula (I) is at least about 1%, by mole based on total mers in the silicon-containing polymeric reaction product.

The silicon-containing polymeric reaction product described herein can include an A mer according to formula (I) and be substantially free of B-mers according to formulae (II), (II-A), (II-B) and D-mers according to formulae (IV), (IV-A) and (IV-B).

The silicon-containing polymeric reaction product described herein can also be a copolymer and contain two or more types of mers. In an embodiment the polymeric reaction product comprises an A mer according to formula (I), and the amount of A mer according to formula (I) is at least about 1% by mole, based on total mers in the silicon-containing polymeric reaction product.

The SV of the silicon-containing polymeric reaction product can vary depending on the types of the polymer and the length of the polymer chains. In some embodiments, the polymeric reaction product has a SV of about 6 mPa·s or greater, or about 7 mPa·s or greater, or about 8 mPa·s or greater, or about 9 mPa·s or greater, or about 10 mPa·s or greater. In some embodiments, the polymeric reaction product has a SV of about 25 mPa·s or less.

Compositions Containing Silicon-containing Polymers

Another aspect of the present invention is directed towards a composition containing a silicon-containing polymer flocculant or silicon-containing polymeric reaction product as described above and at least one additional polymer flocculant. Useful additional polymer flocculants include polyacrylic acid and salts thereof, including sodium and ammonium salts; hydroxamic acid polymers and salts thereof, including sodium and ammonium salts; acrylic acid:acrylamide copolymers and salts thereof including sodium and ammonium salts; starch; and dextran.

In some embodiments, a composition includes a first polymer or silicon-containing polymeric reaction product as described herein and a second polymer or silicon-containing polymeric reaction product different from the first polymer or silicon-containing polymeric reaction product.

Silicon-containing Polymer Flocculants Having High SV

Another aspect of the present invention is a silicon-containing polymer flocculant having a silicon-containing pendant group, wherein the polymer flocculant has an SV of about 9 mPa·s or greater. In some embodiments, the SV of the silicon-containing polymer is about 10 mPa·s or greater. In various embodiments, such polymer flocculants contain relatively high levels of acrylamide units (and/or units formed by reaction of acrylamide units, such as carboxylate units formed by hydrolysis of acrylamide units) and A mers of the formula (I), and relatively low levels of other comonomers.

In some embodiments, the silicon-containing polymer flocculant is an acrylamide copolymer.

In some embodiments, the silicon-containing polymer flocculant comprises an A mer according to formula (I), wherein the amount of the A mer of formula (I) is at least about 1% by mole, based on total mers in the polymer.

In some embodiments, the polymer comprises about 7.5% or less by mole, based on total mers in the polymer, of a B mer of formula (II).

In some embodiments, the polymer comprises about 4% or less by mole, based on total mers in the polymer, of a C mer of formula (III).

In some embodiments, the polymer comprises about 7.5% or less by mole, based on the total mers in the polymer, of a D mer according to formula (IV).

In some embodiments, the polymer further includes a E mer according to formula (V).

In some embodiments, the polymer further includes a F mer according to formula (VI).

In some embodiments, the polymer further includes a G mer according to Formula (VII).

Methods of Preparation

Some of the polymers described herein can be prepared by polymerization of one or more monomers using a polymerization method known in the art, for example, by a method such as radical polymerization using heat, light, electron beam or radiation as a polymerization initiation energy, e.g., by redox initiators or thermal (e.g., azo) initiators. As the polymerization style in these polymerization methods, any suitable polymerization such as mass polymerization, solution polymerization and emulsion polymerization can be adopted. For example, acrylic acid and acrylamide can be copolymerized through inverse emulsion polymerization process to form poly(acrylamide-co-acrylic acid). Any suitable redox polymerization initiator known by those skilled in the art can be used herein.

Polymers or copolymers produced from the polymerization reaction can then undergo one or more reactions to have one or more of the functional groups modified. For example, a poly(acrylamide-co-acrylate) can undergo hydroxamation to form a hydroxamated polyacrylamide (poly(acrylamide-co-acrylate-co-hydroxamate) as is described in U.S. Pat. No. 6,608,137 which is herein incorporated by reference. Alternatively, hydroxamated polymers may be prepared as described in U.S. Pat. No. 5,847,056 which is herein incorporated by reference. In the instant invention, the hydroxamated polymer can then be directly functionalized with silicon-containing glycidyl ethers to form a Si-containing polymer as shown below. Using sub-equimolar equivalents of the glycidyl ether allows for the preparation of polymers containing both hydroxamate and silanol functional groups as illustrated below—

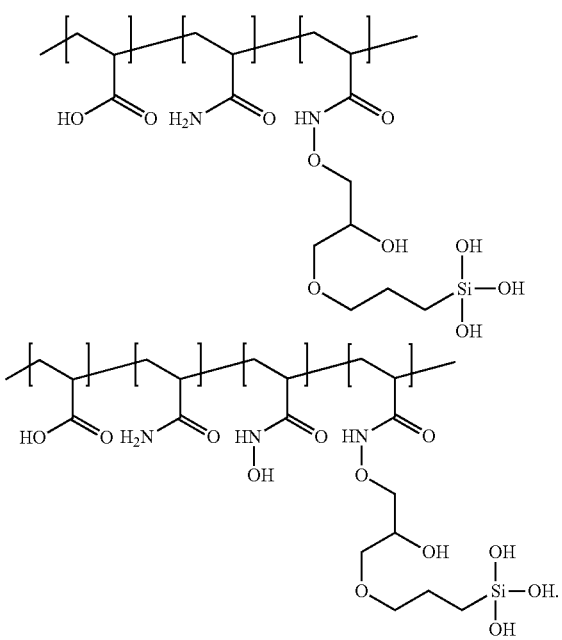

The method of preparation described herein is different from that disclosed in U.S. Patent Application Publication No. 2008/0257827, which discloses incorporation of vinylformamide units into a polyacrylamide backbone, followed by hydrolysis of the formyl group to form an amine group, and then addition of silicon-containing glycidyl ethers to react with the amine group to form pendant Si-containing groups attached to the polymer backbone via the amine nitrogen. Such attachment of the silane pendant groups to the polymer backbone via the amine group instead of the hydroxamate group is illustrated below—

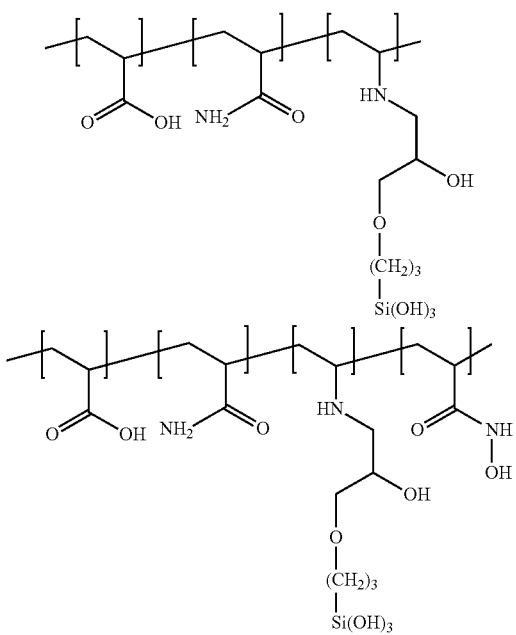

The structure of the polymers can be characterized using $^{13}C$ Nuclear Magnetic Resonance Spectroscopy. Precipitation from an emulsion, followed by centrifugal washing in molecular weight cut-off centrifuge tubes can be used to remove the excess glycidyl ether reactant from the precipitated polymer product. The purified polymer can be analyzed by $^{13}C$ NMR. The relative molecular weight of the polymer can be estimated by measuring the viscosity of a polymer solution in NaOH/NaCl aqueous solution, for example, by Standard Viscosity (SV) determination as described herein. The polymers described in the example are inverse emulsions with the water soluble polymer present in the dispersed aqueous droplets. The backbone polyacrylamide (or poly(acrylamide-co-N-vinylformamide) in the comparative example is made by polymerization of aqueous soluble acrylamide using a redox active radical initiator. Subsequent transformations involve the addition of reagents to the inverse emulsion resulting in hydrolysis of the acrylamide and/or formamide groups, functionalization of the amine with glycidyl ethers, and hydroxamation of the acrylamide groups.

In contrast, as described in the instant invention, conversion of the hydroxamate group to the hydroxamic ester of formula (I) is accomplished by reaction of a hydroxamated polymer with a hydroxamate-reactive compound containing at least one —Si(OR)$_3$ group in the absence of other pendant groups (e.g., a primary amine) which are more reactive.

Transformations involving the addition of silicon-containing glycidyl ethers typically involve slow addition of the reagent.

Emulsion stability tends to be inversely related to the rate of addition of these reagents to either poly(vinylamine-co-acrylamide-co-acrylate), poly(vinylamine-co-acrylamide-co-acrylate-co-hydroxamate) or poly(acrylamide-co-acrylate-co-hydroxamate). Without the controlled addition of these reagents, the stable emulsions tend to form unusable gels. Effective agitation, inert atmosphere and temperature control (roughly 20-35° C.) are helpful to forming stable emulsions, as well.

While the silicon-containing flocculants described in U.S. Patent Application Publication No. 2008/0257827 are able to settle some of the suspended solids, much more of the solids remain suspended and further removal would generally require additional steps. Prior to this disclosure, those skilled in the art would have considered removal of any such unflocculated suspended solids to require the use of a different solids/liquids handling step such as filtration.

Polymer flocculants described herein that include silane pendant groups attached to the polymer backbone via the hydroxamate group show a higher capacity for removal of suspended solids and do not require an auxiliary flocculant such as polyacrylate, hydroxamated polyacrylamide or polyacrylamide-co-acrylate. In preferred embodiments, the polymers described herein have higher SV than silicon-containing polymers disclosed in U.S. Patent Application Publication No. 2008/0257827 and have relatively low levels or are substantially free of pendant amine groups or those formed from the reaction products of the polymer with silicon-containing compounds, such as the following pendant groups: —C(O)NH—C$_{1-6}$ alkyl-Si(OR)$_3$ (wherein C$_{1-6}$ alkyl can be optionally substituted), —NH—(CH$_2$CHOHCH$_2$)—O—(CH$_2$)$_3$—Si(OR)$_3$, and/or —NHC—(=O)NHCH$_2$CH$_2$CH$_2$—Si(OR)$_3$ group.

Methods of Flocculation

The polymers and compositions described herein are useful as flocculants in Bayer or Sinter process and thus may be used for solid/liquid separation in various ways generally known to those skilled in the art. For example, an embodiment provides a flocculation method for a Bayer or Sinter Process, comprising intermixing a polymer or a composition described herein with a process stream in an amount effective to flocculate at least a portion of a solid suspended in the process stream to thereby form an at least partially clarified process stream, wherein the suspended solid is selected from the group consisting of red mud, sinter mud, desilication product, and mixtures thereof.

The flocculated solid in the clarified process stream can be further removed using additional steps generally known to those skilled in the art such as settling and/or filtration. In some embodiments, the flocculation method described herein can further include settling the flocculated solid from the at least partially clarified process stream. In some embodiments, the flocculation method described herein can include filtering at least a portion of the flocculated solid from the at least partially clarified process stream.

In some embodiments the flocculation methods for a Bayer or Sinter process described herein are so efficient that they can be used to clarify the process stream without subsequent filtration. Clarity as described herein can be determined by measuring turbidity. In some embodiments, the at least partially clarified process stream has a turbidity of about 800 NTU (Nephelometric Turbidity Unit) or less. The at least partially clarified process stream clarified using the present silicon-containing polymer flocculant preferably has a turbidity of less than about 700 NTU, about 600 NTU, about 500 NTU, about 400 NTU, or about 300 NTU, without filtration. Turbidity of the partially clarified process can vary depending on the amount of flocculant added and the flocculation method used.

The amount of polymer flocculant or composition containing the polymer flocculant that is intermixed with the process stream can vary over a broad range. Routine experimentation can be employed to determine the polymer dosage for any particular process stream. In some embodiments, the amount of polymer or composition intermixed with the process stream can range from about 0.1 gram of polymer/ton of red mud solid (g/t) to about 100 g/t, preferably about 1 g/t to about 100 g/t, more preferably about 5 g/t to about 50 g/t, about 5 g/t to about 30 g/t, about 10 g/t to about 50 g/t, about 10 g/t to about 30 g/t. In some embodiments, the amount of polymer or composition intermixed with the process stream can be as great or greater than any one of the following: 0.1 g/t, 0.5 g/t, 1 g/t, 5 g/t, 10 g/t, 15 g/t, 19 g/t, 20 g/t, or 25 g/t. In some embodiments, the amount of polymer or composition used in flocculation can be up to or less than any one of the following: 150 g/t, 100 g/t, 90 g/t, 80 g/t, 70 g/t, 60 g/t, 50 g/t, 40 g/t, 30 g/t, or 20 g/t. In some embodiments, the amount of polymer or composition intermixed with the process stream can be about 18.95 g/t.

The settling rate of the at least partially clarified process stream can vary over a wide range. In some embodiments, the at least partially clarified process stream has a settling rate that is about 10 meters per hour (m/h) or greater. In some embodiments, the at least partially clarified process stream has a settling rate that is as great as or greater than any or all of the following: about 1 m/h, 5 m/h, 8 m/h, 15 m/h, 20 m/h, 25 m/h, or 30 m/h.

The polymer flocculants and/or compositions disclosed herein can be used in combination with one or more additional polymers in a flocculation method. Co-dosing of such combinations can be serial and/or simultaneous. The additional polymer can be any polymer known to those skilled in the art to be suitable as a flocculant. In some embodiments, the additional polymer can be hydroxamated polyacrylamide. In some embodiments, the additional polymer can be a hydroxamated polyacrylamide as disclosed in U.S. Pat. No. 6,608,137. In some embodiments, the additional polymer is a polyacrylate. In some embodiments, the additional polymer is an ammonium polyacrylate (commercially available as CYFLOC® 1227 from Cytec Industries, Inc., Woodland Park, N.J.). In some embodiments, the additional polymer is a starch.

For flocculant compositions containing multiple polymer flocculant components, including those containing a silicon-containing polymer flocculant as described herein (e.g., a silicon-containing polymer flocculant for a desilication products (DSP) and a polymer flocculant for a Bayer or Sinter process red mud), it will be appreciated that the components can be combined at or near the time or manufacture and/or shipping, and/or combined at or near the time of use, for example, on-site in the vicinity of a Bayer or Sinter process stream. Those skilled in the art will appreciate that a flocculant composition, including those containing a silicon-containing polymer flocculant as described herein (e.g., a silicon-containing polymer flocculant for a DSP) and/or a polymer flocculant for a Bayer or Sinter process red mud, may be formed during manufacture (e.g., in a relatively concentrated form) and/or prior to use, for example, by on-site intermixing with an aqueous medium, and that it may contain additional components. Examples of additional components include water, salts, stabilizers, and pH adjusting agents, as well as ingredients such as DSP and Bayer or Sinter process red mud. The DSP may comprise, for example, a sodium aluminosilicate. In an embodiment, at least a portion of the DSP is suspended in the flocculant composition.

In some embodiments, an advantage of using polyacrylamide based silane-containing flocculants in conjunction with hydroxamate polyacrylamides is the ability to achieve filter bypass quality process streams by removing enough waste solids so the process stream does not require filtration. Silane-containing flocculants described in U.S. Patent Application Publication Nos. 2008/0257827, 2010/0098607, 2012/0125862 and 2013/0048571 do not achieve this level of clarity when applied to the process streams using the methods described therein. Using embodiments of the polymers and/or compositions described herein can allow customers to avoid filtration costs and eliminate production bottlenecks.

Embodiments of the silicon-containing polymer flocculants and compositions described herein have shown the ability to settle very high silica-containing process streams (>5 wt % $SiO_2$) more efficiently than flocculants described in U.S. Patent Application Publication Nos. 2008/0257827, 2010/0098607, 2012/0125862 and 2013/0048571. The increase in efficiency can translate to lower treatment costs for alumina refineries that process high silica bauxite. In particular, the domestic bauxite that is refined in some countries tends to have such high levels of silicon-containing minerals that flocculation of the mud residue is poorly efficient. This in turn drastically increases the cost of refining alumina from bauxites, so much so that some plants find it more cost effective to refine alumina from bauxite using other industrial processes known to be more expensive than the Bayer process, or import bauxite from other countries. Use of flocculants described herein has the potential to drastically reduce the cost of refining bauxites. The following examples will further describe the present invention, and are used for the purposes of illustration only, and should not be considered as limiting.

EXAMPLES

Example 1

Comparative

Polymer A is a hydroxamated polyacrylamide prepared as disclosed in U.S. Pat. No. 6,608,137. $^{13}$C NMR was used to characterize the precipitated polymer. The polymer was precipitated by diluting 20-30 grams (g) of polymer emulsion into 50 mL of hexane and adding it to 750 mL of a 4:1 volume ratio of acetone to isopropanol under high shear to remove unreacted monomers and reagents. The precipitated polymer suspension was allowed to stir for 15 minutes and the solid residue was then isolated by vacuum filtration, washed with acetone and dried under high vacuum for 16 hours. $^{13}$C NMR of the precipitated polymer indicates the polymer contains 21.0% amide group, 17.4% hydroxamate groups and 61.6% acrylate groups all in mole %. Measured SV was 11.9 mPa·s.

The hydroxamated polyacrylamide prepared is shown below. Based on $^{13}$C NMR characterization, a is about 61%, b is about 21%, and c is about 17%.

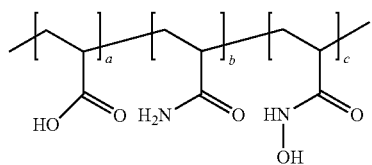

Example 2

Comparative

Polymer B was prepared as disclosed in Example 17 (Reagent U) of U.S. Patent Application Publication Nos. 2008/0257827. The polymer backbone poly(acrylamide-co-N-vinylformamide-co-acrylate was synthesized by an inverse emulsion polymerization process as described below.

Sorbitan monooleate (12.0 g) and C12-C14 alcohol ethoxylate nonionic surfactant (Surfonic L-24-7 (Huntsman, Salt Lake City, Utah, USA) 4.57 g) were added to hydrocarbon oil Escaid 110 (94.5 g). Separately, acrylic acid (3.94 g), N-vinylformamide (10.05 g), isopropanol (0.13 g), DI water (51.66 g), ammonium hydroxide (3.06 g) and 40% pentasodium diethylenetriaminepentaacetate (0.53 g) were added to a 53 wt % aqueous solution of acrylamide (219.53 g). The two solutions were mixed and homogenized to afford an inverse emulsion. 3% t-butylhydroperoxide (0.61 g) was added while purging the emulsion with nitrogen. After purging for 30 min, sulfur dioxide gas (0.4% in nitrogen) was charged into the emulsion to initiate polymerization. The polymerization was carried out between 40° C. and 45° C. for 4 hours. The resulting polymer backbone emulsion product contained 32.5% polymer and had a SV of 2.85 mPa·s.

The polymer backbone emulsion poly(acrylamide-co-N-vinylformamide-co-acrylate containing 90 mol % polyacrylamide, 7 mol % poly(N-vinylformamid)e and 3 mol % polyacrylate was agitated and stirred under a nitrogen atmosphere. The composition of the polymer was calculated from the reactants charged.

The polymer backbone poly(acrylamide-co-N-vinylformamide-co-acrylate) prepared above underwent hydrolysis and then reacted with hydroxylammonium sulfate following by reaction with (3-glycidyloxypropyl)trimethoxysilane as described below.

Hydrocarbon oil (available as Escaid 110 from ExxonMobil Chemical, Houston, Tex., USA) (63.38 g) was added to the polymer backbone emulsion prepared above, followed by an ethoxylated oleylamine surfactant with a degree of ethoxylation of 2 (commercially available as Lumulse® POE-2 Oleylamine from Lambent Technologies, Gurnee, Ill., USA) (4.06 g) and let stir for 15 minutes.

In a separate reactor, hydroxylammonium sulfate (10.78 g) was dissolved in deionized water (85.01 g), cooled to 0° C. followed by addition of 50% NaOH (57.51 g). This solution was added to the stirring polymer emulsion over the course of 5 minutes and stirred at 25° C. for 16 hours, followed by heating to 55° C. for 2 hours.

After heating, the temperature was lowered to 12° C., and 9.54 g of (3-glycidyloxypropyl)trimethoxysilane was added over 2 minutes and then stirred at 40° C. for 1 hour. The temperature was lowered to 25° C. and sodium thiosulfate (8.32 g) was added and then stirred for an additional hour.

The composition of the resultant reacted polymer emulsion was determined by $^{13}$C NMR.

The mole ratio of acrylamide:hydroxamate:acrylate was measured directly from the spectrum $^{13}$C NMR of the emulsion product. The NMR spectrum of the emulsion product indicated the mole ratio to be 23% amide:16% hydroxamate:52% acrylate. The mole ratio of total amine resulting from hydrolysis of formamide groups was determined by the amount (mole ratio) of sodium formate produced by hydrolysis of formamide groups. The NMR spectrum of the resultant reacted polymer emulsion showed that it contained 8±1 mole % sodium formate resulting from the complete hydrolysis of the polymeric pendant formamide group present in the polymer yielding polymeric pendant amine groups. Thus, the mole ratio of total polymeric amine group in the product was determined to be 8±1 mole %.

The amount of amine that had reacted with the (3-glycidyloxypropyl)trimethoxysilane was determined by firstly isolating the pure polymer from the emulsion by precipitation as described below and then by examining the NMR spectrum thereof. The emulsion polymer was precipitated by diluting 20-30 g of polymer emulsion into 50 mL of hexane and adding it to 750 mL of a 4:1 volume ratio of acetone to isopropanol under high shear to remove unreacted monomers and reagents. The precipitated polymer suspension was allowed to stir for 15 minutes then the solid residue was isolated by vacuum filtration, washed with acetone and dried under high vacuum for 16 hours.

$^{13}$C NMR was then used to further characterize the precipitated polymer, specifically to measure directly the amount of (3-glycidyloxypropyl)trimethoxysilane covalently bound to the polymer by measuring the signal from the carbon atoms alpha to the Si atom. The precipitation process removes any unreacted silane from the product mixture. The alpha carbon signals indicate the amount of silane groups bound to the polymer. The mole ratio amount of (3-glycidyloxypropyl)trimethoxysilane which had reacted with the polymeric amine groups was found to be 4%. The amount of free unreacted polymeric amine groups was calculated at 4% by subtracting the amount of polymer bound silane measured on the precipitated polymer (4 mole %) from the total amount of amine group resulting from hydrolysis of all of the formamide groups (i.e., 8%−4%=4 mole %).

Attachment of silane pendant groups to the polymer backbone via the amine group instead of the hydroxamate group is illustrated below. $^{13}$C NMR spectrum of the emulsion product indicated that a was about 52.4%, b was about 22.8%, c was about 16.4%, d was about 4% and e was about 4%. The cationic counterions for anionic groups a, c and d are all Na$^+$.

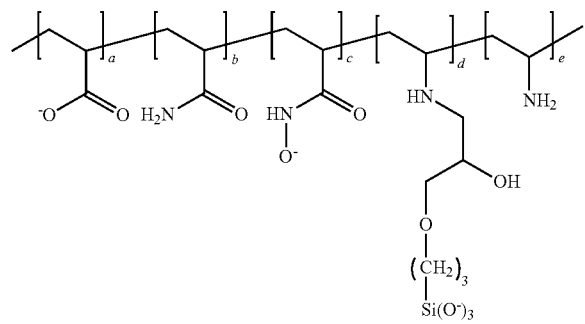

Measured SV of the product emulsion was 2.56 mPa·s immediately after the sample was prepared. The SV increased to 8.67 mPa·s upon standing for 80 days.

Example 3

Polymer C was prepared as follows. 70 grams of an emulsion copolymer of acrylamide and acrylic acid which had been partially hydroxamated as described in U.S. Pat. No. 6,608,137 was added to a 250 mL three-neck round bottom flask equipped with overhead mechanical stirrer and nitrogen purging, followed by 0.36 g of an ethoxylated oleylamine surfactant with a degree of ethoxylation of 2 (commercially available as Lumulse® POE-2 Oleylamine from Lambent Technologies, Gurnee, Ill., USA). Mole ratios of the components in the hydroxamated polymer were about 21 mol % amide, about 61 mol % acrylate and about 17 mol % hydroxamate, and polymer solids were 16.7% by weight based on the starting emulsion copolymer of acrylamide and acrylic acid (i.e., this percentage does not include the mass of either the sodium counterion or hydroxamate group added to the polymer backbone. After 10 min, a solution of 10.4 g 50 wt % NaOH aqueous solution (0.13 mol) and 2.6 g DI water was added over 20-30 min. After 30 min, a solution of 7.7 g GPTS ((3-glycidyloxypropyl)trimethoxysilane, 0.033 mol) and 6.9 g of hydrocarbon oil (commercially available as Escaid 110 from ExxonMobil Chemical) was added using a syringe pump at 15.6 mL/h. The emulsion was allowed to stir at room temperature for 16 h. $^{13}$C NMR was used to characterize the precipitated polymer. The polymer was precipitated by diluting 20-30 g of polymer emulsion into 50 mL of hexane and adding it to 750 mL of a 4:1 volume ratio of acetone to isopropanol under high shear to remove unreacted monomers and reagents. The precipitated polymer suspension was allowed to stir for 15 minutes then the solid residue was isolated by vacuum filtration, washed with acetone and dried under high vacuum for 16 hours.

$^{13}$C NMR taken at 100.58 MHz in deuterium oxide of the precipitated polymer indicated the polymer contained 16% acrylamide (180-182 ppm), 67% acrylate (182-186), and 17% attached silane (integration of peaks at 8-11 ppm corresponding to the alpha carbons to the silicon atom). The mol % of unreacted hydroxamate (<1%) was determined by subtracting the mol % of attached silane from the hydroxamate peak at 167-170 ppm. The measured SV was 8.2 mPa·s immediately after the polymer was prepared. The SV increased to 10.8 mPa·s after three days.

When measuring the amount of attached silane to polyacrylamide inverse emulsions, the polymer was precipitated from the emulsion in order to separate it from the unreacted silanes and other byproducts. 50 mL of hexane was added to 20-30 g of emulsion followed by addition to 750 mL of a 4:1 ratio of acetone to isopropanol under high shear. The solid residue was isolated by vacuum filtration and dried under high vacuum to remove any organic solvent residue. $^{13}$C NMR in deuterium oxide can determine the mol % of acrylate (182-186 ppm) and acrylamide (180-182 ppm). The resonances of the alpha and beta carbons to the silicon atom were found at 8-11 and 22-25 ppm, respectively.

The attachment of silane pendant groups to the polymer backbone via the hydroxamate group is illustrated below. Based on $^{13}$C NMR characterization, a is about 67%, b is about 16%, c is about 0% and d is about 17%. The percentage of group d is based on the peak intensity of the carbon atom alpha to the silicon atom at 8-11 ppm. The cationic counterions for anionic groups a, c and d are all Na$^+$.

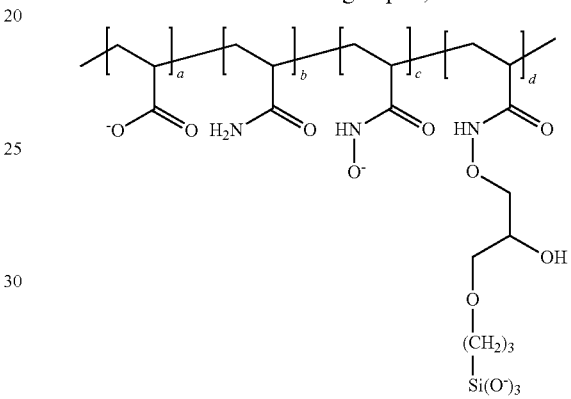

Example 4

Comparative

Polymer D was made according to the method disclosed in Example 16 (Reagent T) of U.S. Patent Application Publication No. 2008/0257827. A polymer backbone emulsion of poly(acrylamide-co-acrylic acid) was prepared without containing any N-vinylformamide. The emulsion product contained 32% real polymer.

The hydroxyl amine solution to be charged to the emulsion was prepared as follows. 9.17 g of hydroxylamine sulfate and 35 g de-ionized water were charged to a container and stirred until all sulfate was dissolved. 0.88 g of anhydrous sodium thiosulfate was added and the solution was again stirred until all thiosulfate was dissolved. Under agitation, 17.25 g of 50% sodium hydroxide solution was then added dropwise to produce the hydroxylamine solution. The solution temperature was kept below 30° C. during the addition of sodium hydroxide.

98.26 g of the polymer backbone emulsion was charged into the reactor. Under agitation and nitrogen blanket 51.89 g of a dearomatized hydrocarbon fluid (commercially available as Exxsol D-80 from ExxonMobil Chemical) was added, followed by 3.4 g of an ethoxylated oleylamine surfactant with a degree of ethoxylation of 2 (commercially available as Lumulse® POE-2 Oleylamine from Lambent Technologies, Gurnee, Ill., USA). The emulsion was then cooled to 0° C. The emulsion was stirred at 500 rpm while 10.62 g of 50% sodium hydroxide was added, followed by 20.48 g of sodium hypochlorite (11.5% available chlorine) solution. The stirring rate was reduced to 300 rpm after 5 minutes and the emulsion was stirred for an hour. The stirring rate was then increased to 500 rpm and 2.12 g of 50% sodium hydroxide, followed by 4.1 g of sodium hypochlorite (11.5% available chlorine), were charged. Two hours later 7.42 g of 3-aminopropyltriethoxysilane was added. The reaction was carried out for 4 hours at 0° C., 10 hours at room temperature, and 4 hours at 40° C. When the reaction mixture was cooled to room temperature, the hydroxyl amine solution was charged over 5 minutes. The emulsion was stirred at room temperature for an hour and the product was discharged. The aqueous solution of the product was prepared by breaking the white emulsion into a 2% sodium hydroxide solution containing 9.5 mole ethoxylate of nonylphenol (commercially available as SURFONIC® N-95 from Huntsman, The Woodlands, Tex., USA), yielding Polymer D. Polymer D had a SV of 4.53 mPa·s immediately after preparation and 2.07 mPa·s after 11 days aging at room temperature.

Example 5

Polymers and compositions described herein were used to settle red mud solids and other solids from Bayer process streams. In order to measure performance of these materials, laboratory settling tests known by those skilled in the art to be representative of the industrial process of solids removal in a continuous operation were used. Synthetic Bayer liquor was prepared (solution of NaOH, $Na_2CO_3$ and $NaAlO_4$ in water) and mixed with red mud solids obtained directly from working alumina refineries. Slurries were prepared at roughly 50 g/L and were kept at 98° C. for the duration of the test. The polymeric emulsion was made aqueous continuous by addition to a 2% NaOH solution with strong agitation followed by two hours of light agitation, and then dosed directly into the slurry. Settling rates and overflow clarity measurements were made to compare performance of each flocculant tested.

To perform settling tests using the polymers, synthetic Bayer liquor ("SBL") was made by adding 342 g sodium aluminate, 60 g sodium hydroxide and 40 g sodium carbonate to water to a make a total of 1000 mL of SBL and heating to 90° C.

For the settling tests, red mud solids with high silica content were obtained from a Bayer plant. The solids were dispersed in the above SBL, generally to give a slurry containing about 45 g/L of suspended solids. Dilute reagent was mixed into slurry contained in a graduated cylinder, using a perforated plunger, and the time to settle a fixed distance was measured so that a settling rate for the flocculated solids could be calculated. Also, after fifteen minutes a sample of the supernatant liquor was taken and measured for turbidity.

Red mud solids composition described below was measured by X-ray fluorescence.

TABLE 1

Red mud solids composition

| | $Na_2O$ | MgO | $Al_2O_3$ | $SiO_2$ | $SO_3$ | $K_2O$ | CaO | $TiO_2$ | $Fe_2O_3$ |
|---|---|---|---|---|---|---|---|---|---|
| Red mud solids | 3.9 | 1.1 | 16.3 | 14.7 | 0.61 | 1.9 | 18.5 | 8.8 | 27.0 |

Component (Mass %)

TABLE 2

Settling test results

| Test | Polymer | dose real (g/t) | Settling rate (m/Hr) | Supernatant clarity (NTU) |
|---|---|---|---|---|
| 1 | Polymer A | 18.95 | 7.88 | 4162 |
| 2 | Polymer C | 18.95 | 9.82 | 3628 |
| 3 | Polymer B | 18.95 | 4.21 | 3540 |
| 4 | Polymer D | 18.95 | 2.34 | 1696 |
| 5 | Polymer A | 28.42 | 13.10 | 1805 |
| 6 | Polymer C | 28.42 | 18.00 | 1560 |
| 7 | Polymer B | 28.42 | 6.72 | 2543 |
| 8 | Polymer D | 28.42 | 3.07 | 1864 |
| 9 | Polymer A | 37.89 | 17.31 | 1155 |
| 10 | Polymer C | 37.89 | 22.80 | 826 |
| 11 | Polymer B | 37.89 | 8.15 | 2090 |
| 12 | Polymer D | 37.89 | 3.55 | 1937 |
| 13 | Polymer A | 12.32 | 3.57 | 4582 |
| 14 | Polymer C | 12.32 | 4.16 | 5012 |
| 15 | Polymer B | 12.32 | 2.25 | 3718 |
| 16 | Polymer D | 12.32 | 1.47 | 1666 |

This example shows that polymer C provides a better combination of high settling rates and good clarity than the other three polymers with the same dosing amount under these conditions.

Additional silicon-containing polymers, Examples 6-12, were prepared as shown in Table 3 below.

Example 6 was prepared as follows.

250.0 g of poly(acrylamide-co-acrylate-co-hydroxamated acrylamide) emulsion (62.3 mole % of acrylate, 24.6 mole % of amide, and 13.1 mole % of hydroxamate) prepared as described in U.S. Pat. No. 6,608,137 was added to a 500 ml cylindrical, indented, jacketed glass reaction vessel equipped with overhead mechanical stirrer and nitrogen purging. Strong agitation (400-500 rpm) and external cooling via the cooling jacket (water; 15° C.) were applied during the whole addition process. 0.25 g of Lumulse POE-2 was then added. After 10 min, 11.5 g of 40% NaOH aqueous solution was added dropwise over 10-15 min. After 15-30 mins, a solution of 8.6 g GPTS (3-glycidyloxypropyl) trimethoxysilane and 7.7 g hydrocarbon oil Escaid 110 was added using a HPLC pump over 3-4 hours. GPTS solution was then added beneath the emulsion surface and close to the agitator to ensure good mixing. After the addition, external cooling was terminated and the emulsion was allowed to stir at room temperature for 1-2 h. The emulsion was then discharged to achieve the final product. Examples 7-12 were prepared by the same procedure except that the degree of hydroxamation of the backbone polymer, the backbone molecular-weight, and amounts of added GPTS were varied.

The polymers varied in silane content and SV as is described in the Table 3 below. The silane content was varied by adding different amounts of glycidoxypropyltrimethoxysilane (GPTS) to the hydroxamated polymer. The mole ratio of GPTS to hydroxamate (GPTS/HX) is shown in the Table 3 below. SV is correlated to the molecular weight of the polymer. The higher the SV, the higher the molecular weight. The SV of the silicon-containing polymers was varied by adding a chain transfer agent to lower the molecular weight of the backbone emulsion copolymer of acrylamide and acrylic acid which was used to prepare the hydroxamated polymer. This which was then, in turn, used to prepare the silicon-containing polymer. The SV data shows the initial SV 1-3 days after preparation and the maximum SV attained after the sample had aged. The maximum SV is normally attained within 30 days of preparation. The silane content is determined by dividing the integral of the carbon peaks alpha to the silane group at 8-11 ppm by the total integral of the carbonyl signals for the amide (190-182 ppm), acrylate (182-186 ppm) and hydroxamate (167-170 ppm) groups.

For the settling tests, red mud solids with high silica content were obtained from a Bayer plant. The solids were dispersed in the above SBL, generally to give a slurry

TABLE 3

| | Hydroxamated polymer backbone | | | | | | Silicon containing polymer | | | | |
|---|---|---|---|---|---|---|---|---|---|---|---|
| | | Composition mole % | | | | | | Composition mole % | | | |
| Example | SV mPa.s | Acrylate | Amide | Hydroxamate | Total | GPTS/HX mole ratio[1] | SV mPa.s (initial-max) | Acrylate (Ac) | Amide (Am) | Hydroxamate Total[2] (HxT) | Silane[3] | Total Ac + Am + HxT |
| 6 | | 62.30 | 24.60 | 13.10 | 100.00 | 0.46 | 8.9-12.8 | 63.85 | 22.90 | 13.25 | 3.50 | 100.00 |
| 7 | | 62.70 | 20.60 | 16.70 | 100.00 | 0.71 | 8.8-12.2 | 61.85 | 22.75 | 15.40 | 10.15 | 100.00 |
| 8 | 11.10 | 60.00 | 12.00 | 28.00 | 100.00 | 1.43 | 5.8-12.2 | 69.00 | 4.40 | 26.60 | 36.15 | 100.00 |
| 9 | | 35.50 | 6.00 | 58.50 | 100.00 | 0.76 | 4.7-12.3 | 38.00 | 5.10 | 56.90 | 46.30 | 100.00 |
| 10 | 9.60 | 58.70 | 24.50 | 16.80 | 100.00 | 1.19 | 10.50 | 62.85 | 22.85 | 14.30 | 17.80 | 100.00 |
| 11 | 8.90 | 58.70 | 25.10 | 16.20 | 100.00 | 1.23 | 9.50 | 64.90 | 18.45 | 16.65 | 15.55 | 100.00 |
| 12 | 4.95 | 58.00 | 24.70 | 17.30 | 100.00 | 1.16 | 5.60 | 59.20 | 24.05 | 16.75 | 17.70 | 100.00 |

[1] Ratio of glycidoxypropyltrimethoxysilane to backbone hydroxamate
[2] Hydroxamate total includes silane-reacted hydroxamate and unreacted hydroxamate
[3] Silane attached to the polymer The silicon containing polymers examples 6-12 were the tested by the procedure as described below and results reported in Tables 5 and 6.

Polymers and compositions described herein were used to settle red mud solids and other solids from Bayer process streams. In order to measure performance of these materials, laboratory settling tests known by those skilled in the art to be representative of the industrial process of solids removal in a continuous operation were used. Synthetic Bayer liquor was prepared (solution of NaOH, $Na_2CO_3$ and $NaAlO_4$ in water) and mixed with red mud solids obtained directly from working alumina refineries. Slurries were prepared at roughly 45 g/L and were kept at 98° C. for the duration of the test. The polymer emulsion was made aqueous by addition to a 2% NaOH solution with strong agitation for short period of time (5 minutes) followed by two hours of light agitation. The emulsion solution is further diluted with 2% NaOH solution and dilute reagent is dosed into the slurry. Settling rates and overflow clarity measurements were made to compare performance of each flocculant tested.

To perform settling tests using the polymers, synthetic Bayer liquor ("SBL") was made by adding 384 g sodium aluminate trihydrate, 59 g sodium hydroxide, and 35 g sodium carbonate to water to make a total of 1000 mL of SBL and heating to 90° C.

containing about 45 g/L of suspended solids. Dilute reagent was mixed into slurry contained in a graduated cylinder, using a perforated plunger, and the time to settle a fixed distance was measured so that a settling rate for the flocculated solids could be calculated. Also, after fifteen minutes, a sample of the supernatant liquor was taken from a certain position and measured for turbidity.

The composition of red mud solids corresponding to tests shown in Tables 5 and 6 is described below in Table 4 as measured by X-Ray Fluorescence.

TABLE 4

| Red mud solids composition | | | | | | | | | |
|---|---|---|---|---|---|---|---|---|---|
| | Component (Mass %) | | | | | | | | |
| | $Na_2O$ | MgO | $Al_2O_3$ | $SiO_2$ | $SO_3$ | $K_2O$ | CaO | $TiO_2$ | $Fe_2O_3$ |
| Red mud solids | 4.18 | 1.41 | 18.0 | 16.6 | 0.72 | 2.07 | 25.6 | 4.66 | 11.9 |

TABLE 5

| Settling test results for Examples 6-9. | | | | | | | |
|---|---|---|---|---|---|---|---|
| | Dose | Settling rate (m/hr) | | | Turbidity (NTU) | | |
| Flocculant | real (g/T) | Repeat 1 | Repeat 2 | Average | Repeat 1 | Repeat 2 | Average |
| No flocculant | 0 | Not measureable* | Not measureable* | — | 9440 | 9005 | 9223 |
| Example 6 | 16 | 5.0 | 4.3 | 4.7 | 5090 | 5115 | 5103 |
| | 27 | 10.2 | 9.1 | 9.7 | 4400 | 3490 | 3945 |
| | 39 | 13.3 | 13.3 | 13.3 | 4190 | 3240 | 3715 |
| | 50 | 13.6 | 12.4 | 13.0 | 3910 | 3035 | 3473 |
| Example 7 | 16 | 7.3 | 7.1 | 7.2 | 3839 | 4174 | 4007 |
| | 27 | 14.1 | 14.3 | 14.2 | 1515 | 1386 | 1451 |

TABLE 5-continued

Settling test results for Examples 6-9.

| Flocculant | Dose real (g/T) | Settling rate (m/hr) | | | Turbidity (NTU) | | |
|---|---|---|---|---|---|---|---|
| | | Repeat 1 | Repeat 2 | Average | Repeat 1 | Repeat 2 | Average |
| | 39 | 21.2 | 17.8 | 19.5 | 653 | 911 | 782 |
| | 50 | 17.2 | 19.0 | 18.1 | 704 | 939 | 822 |
| Example 8 | 16 | 8.1 | 8.1 | 8.1 | 574 | 714 | 644 |
| | 27 | 12.0 | 11.3 | 11.7 | 249 | 299 | 274 |
| | 39 | 14.0 | 13.2 | 13.6 | 202 | 209 | 206 |
| | 50 | 17.4 | 14.5 | 16.0 | 183 | 232 | 208 |
| Example 9 | 16 | 6.9 | 7.1 | 7.0 | 239 | 288 | 264 |
| | 27 | 10.7 | 11.0 | 10.9 | 106 | 123 | 115 |
| | 39 | 13.8 | 13.7 | 13.8 | 95 | 97 | 96 |
| | 50 | 17.0 | 13.8 | 15.4 | 72 | 98 | 85 |

Note:
*interface not visible since turbidity is too high

Table 5 shows that all of the silane containing polymers tested settled the red mud solids and that turbidity improves as amount of silane increases. These examples also show that silane containing polymers containing as little as 3.5 mole % are effective flocculants.

TABLE 6

Settling test results for Examples 10-12.

| Flocculant | Dose real (g/T) | Settling rate (m/hr) | | | Turbidity (NTU) | | |
|---|---|---|---|---|---|---|---|
| | | Repeat 1 | Repeat 2 | Average | Repeat 1 | Repeat 2 | Average |
| No flocculant | 0 | Not measureable* | Not measureable* | — | 9800 | 8225 | 9013 |
| Example 10 | 15 | 7.0 | 6.9 | 7.0 | 2965 | 2639 | 2802 |
| | 26 | 10.9 | 10.2 | 10.6 | 933 | 1159 | 1046 |
| | 37 | 13.4 | 12.3 | 12.9 | 742 | 654 | 698 |
| | 48 | 13.6 | 14.4 | 14.0 | 515 | 567 | 541 |
| Example 11 | 15 | 6.3 | 6.0 | 6.2 | 3275 | 3161 | 3218 |
| | 26 | 10.5 | 10.7 | 10.6 | 1101 | 1204 | 1153 |
| | 37 | 12.1 | 12.7 | 12.4 | 720 | 863 | 792 |
| | 48 | 12.5 | 13.9 | 13.2 | 621 | 667 | 644 |
| Example 12 | 15 | 3.2 | 2.8 | 3.0 | 2955 | 2420 | 2688 |
| | 26 | 4.9 | 4.5 | 4.7 | 2447 | 2395 | 2421 |
| | 37 | 6.0 | 5.6 | 5.8 | 1924 | 2171 | 2048 |
| | 48 | 7.0 | 5.8 | 6.4 | 1420 | 1876 | 1648 |

Note:
*interface not visible since turbidity is too high

Examples 10-12 show that polymers with SVs≥about 9 (Examples 10 and 11) gave very good settling rates and clarities. Example 12, which had a SV<9, was able to settle the red mud and give improved clarity. However, its performance was not as good when compared to the other higher SV polymers.

Although the foregoing description has shown, described, and pointed out fundamental novel features of the present teachings, it will be understood that various omissions, substitutions, and changes in the form of the detail of the apparatus as illustrated, as well as the uses thereof, may be made by those skilled in the art without departing from the scope of the present teachings. Consequently, the scope of the present teachings should not be limited to the foregoing discussion, but should be defined by the appended claims.

What is claimed is:
1. A polymer comprising an A mer according to formula (I):

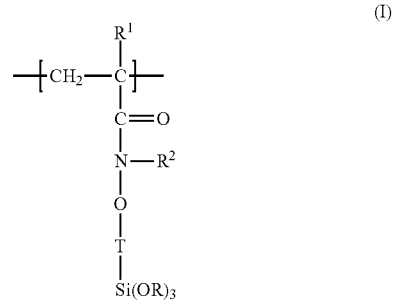

wherein:

$R^1$ and $R^2$ are each independently H;

T is —CH2-CH(OH)—CH2-O—CH2-CH2-CH2 ;

each R is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4{}^+$; wherein R' is independently selected from the group consisting of hydrogen, $C_{1-20}$ alkyl, $C_{1-20}$ alkenyl, $C_{6-12}$ aryl, and $C_{7-20}$ aralkyl;

and wherein R' is independently unsubstituted, hydroxy-substituted, or beta hydroxy substituted or a mixture, in any proportion, of any of these groups;

and wherein the amount of A mer according to formula (I) is about 1% or greater by mole, based on total mers in the polymer;

and further comprising:

an E mer according to formula (V);

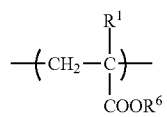
(V)

wherein $R^1$ is H or C1-6 alkyl and $R^6$ is H, group I metal ion, group II metal ion, or $N(R^3)_4{}^\pm$ where each $R^3$ is independently H, C1-6 alkyl, or a F mer according to formula (VI);

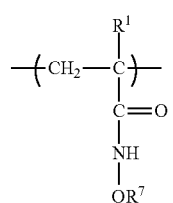
(VI)

wherein $R^1$ is H or C1-6 alkyl and $R^7$ is H, group I metal ion, group II metal ion, or $N(R^3)_4{}^\pm$ where each $R^3$ is independently H, C1-6 alkyl, or a G mer according to formula (VII);

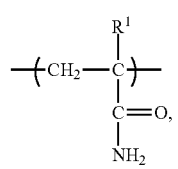
(VII)

where $R^1$ is H or $C_{1-6}$ alkyl or any combinations thereof.

2. The polymer of claim 1 further comprising about 7.5% or less by mole, based on total mers in the polymer, of a B mer according to formula (II);

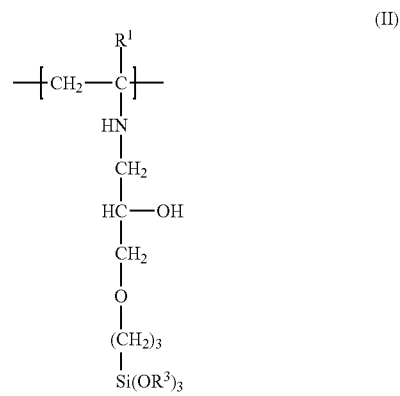
(II)

wherein $R^1$ is H or C1-6 alkyl and each $R^a$ is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4{}^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups;

and a H mer according to formula VIII combined;

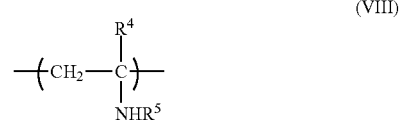
(VIII)

wherein $R^4$ and $R^5$ are each independently H or optionally substituted C1-6 alkyl.

3. The polymer of claim 2 further comprising about 7.5% or less by mole, based on total mers in the polymer, of a B-1 mer according to formula (II-A) or a B-2 mer according to formula (II-B) combined.

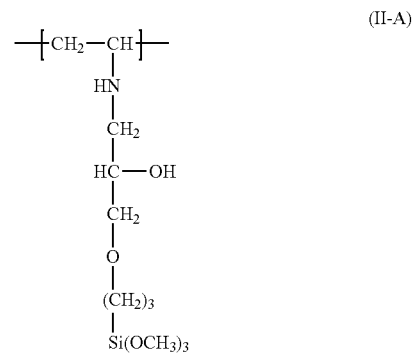
(II-A)

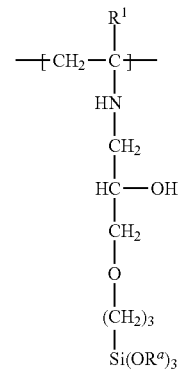

(II-B)

4. The polymer according to claim 2, wherein $R^4$ and $R^5$ are both H.

5. The polymer according to claim 4, wherein $R^6$ and $R^7$ are selected from $Na^+$ and $N(R^3)_4^+$ or mixtures thereof, where each $R^3$ is independently H or $C_{1-6}$ alkyl.

6. The polymer according to claim 1, wherein R is $Na^+$.

7. The polymer according to claim 1, wherein the amount of A mer according to formula (I)

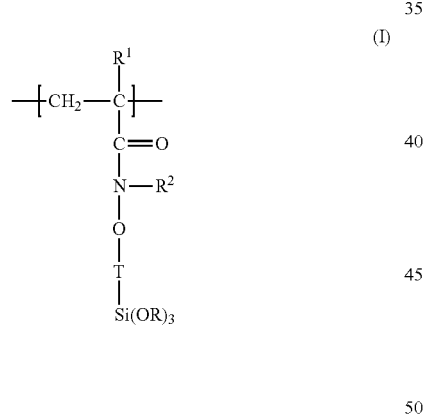

(I)

wherein $R^1$ is H or $C_{1-6}$ alkyl and each R is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups; is from about 1% to about 90% by mole, based on total mers in the polymer;

further comprising about 1% or less by mole, based on total mers in the polymer, of a B mer according to formula (II);

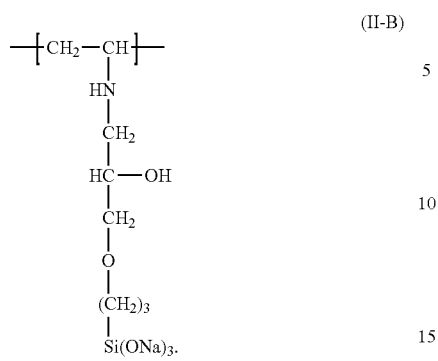

(II)

wherein each $R^1$ is H or $C_{1-6}$ alkyl and each $R^a$ is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups; and further comprising about 1% or less by mole, based on total mers in the polymer, of a C mer according to formula (III);

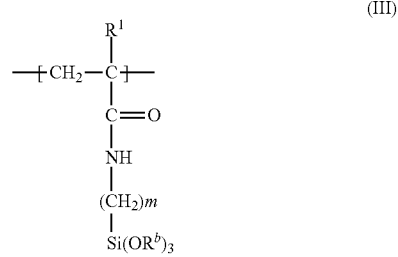

(III)

wherein $R^1$ is H or $C_{1-6}$ alkyl and m is 1 to 6, and each $R^b$ is independently selected from the group consisting of hydrogen, $C_{1-20}$ alkyl, $C_{1-20}$ alkenyl, $C_{6-12}$ aryl, $C_{7-20}$ aralkyl, a group I metal ion, a group II metal ion, and $NR'_4^+$; wherein R' is independently selected from the group consisting of hydrogen, $C_{1-20}$ alkyl, $C_{1-20}$ alkenyl, $C_{6-12}$ aryl, and $C_{7-20}$ aralkyl; and wherein R' is independently unsubstituted, hydroxy-substituted, or beta hydroxy substituted or a mixture, in any proportion, of any of these groups.

8. The polymer according to claim 7, wherein the amount of E mer according to formula (V);

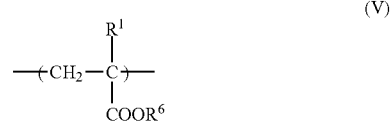

(V)

wherein $R^1$ is H or $C_{1-6}$ alkyl and $R^6$ is H, group I metal ion, group II metal ion, or $N(R^3)_4^+$ where each $R^3$ is independently H, $C_{1-6}$ alkyl, is from about 1% to about 90% by mole, based on total mers in the polymer and wherein the amount of the F mer according to formula (VI);

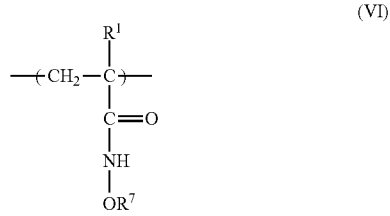

wherein $R^1$ is H or $C_{1-6}$ alkyl and $R^7$ is H, group I metal ion, group II metal ion, or $N(R^3)_4^+$ where each $R^3$ is independently H, $C_{1-6}$ alkyl,
is from about 0.1% to about 90% by mole, based on total mers in the polymer and the amount of G mer according to formula (VII);

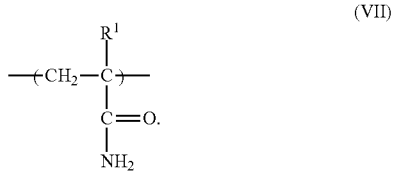

wherein $R^1$ is H or $C_{1-6}$ alkyl and is from about 1% to about 30% by mole, based on total mers in the polymer.

9. The polymer according to claim 1, wherein the polymer has a standard viscosity (SV) of about 9 mPa·s or greater, as determined based upon a 0.1% polymer solution.

10. The polymer of claim 9 having a SV of about 10 mPa·s or greater.

11. A composition comprising a first polymer according to claim 1 and a second polymer different from the first polymer wherein the second polymer is chosen from polyacrylic acid, and salts thereof; including sodium and ammonium salts; hydroxamic acid polymers and salts thereof, including sodium and ammonium salts; acrylic acid:acrylamide copolymers and salts thereof, including sodium and ammonium salts, starch, and dextran.

12. A method of flocculating a solid suspended in a Bayer or Sinter process stream comprising intermixing a polymer according to claim 1 with a Bayer or Sinter process stream in an amount effective to flocculate at least a portion of a solid suspended in the process stream, thereby forming an at least partially clarified process stream, wherein the suspended solid is chosen from red mud, sinter mud, desilication product, and mixtures thereof.

13. The method according to claim 12, further comprising settling the flocculated solid from the at least partially clarified process stream.

14. The method according to claim 12, comprising filtering at least a portion of the flocculated solid from the at least partially clarified process stream.

15. The method according to claim 12 claim, wherein the amount of polymer intermixed with the process stream is from about 0.1 g/t to about 50 g/t.

* * * * *